(12) United States Patent
Elshafie et al.

(10) Patent No.: US 11,595,946 B2
(45) Date of Patent: Feb. 28, 2023

(54) SIDELINK RESOURCE SELECTION

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/248,188

(22) Filed: Jan. 13, 2021

(65) Prior Publication Data

US 2022/0225282 A1 Jul. 14, 2022

(51) Int. Cl.
*H04W 72/02* (2009.01)
*H04W 74/08* (2009.01)
*H04W 74/00* (2009.01)
*H04W 72/10* (2009.01)
*H04W 88/04* (2009.01)

(52) U.S. Cl.
CPC .......... *H04W 72/02* (2013.01); *H04W 72/10* (2013.01); *H04W 74/002* (2013.01); *H04W 74/0833* (2013.01); *H04W 88/04* (2013.01)

(58) Field of Classification Search
CPC ... H04W 72/02; H04W 72/10; H04W 74/002; H04W 74/0833; H04W 88/04
See application file for complete search history.

(56) References Cited

U.S. PATENT DOCUMENTS

| | | | |
|---|---|---|---|
| 2016/0338094 A1* | 11/2016 | Faurie | H04W 72/14 |
| 2017/0142741 A1* | 5/2017 | Kaur | H04W 72/12 |
| 2018/0077618 A1* | 3/2018 | Lee | H04W 76/40 |
| 2018/0152921 A1* | 5/2018 | Jung | H04W 72/04 |
| 2018/0199312 A1* | 7/2018 | Wu | H04W 72/02 |
| 2019/0394786 A1* | 12/2019 | Parron | H04L 27/0006 |
| 2021/0359788 A1* | 11/2021 | Uziel | H04L 5/0032 |
| 2022/0104211 A1* | 3/2022 | Elshafie | H04L 47/821 |

* cited by examiner

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, a first user equipment (UE) may communicate with one or more second UEs to identify a resource overlap for a resource for relay communication. The first UE may selectively transmit using the resource with the resource overlap in accordance with a random access procedure. Numerous other aspects are described.

30 Claims, 13 Drawing Sheets

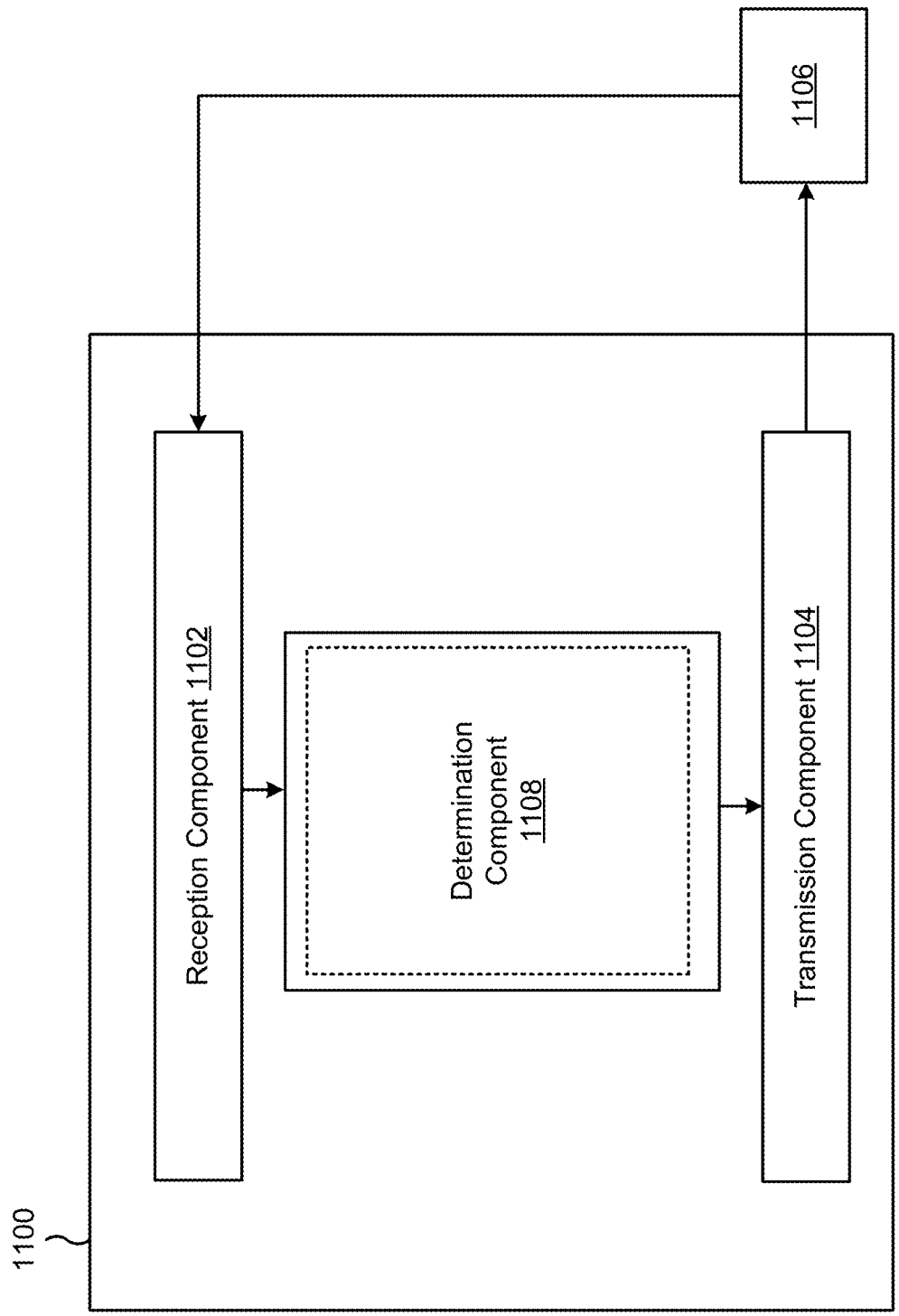

SIDELINK RESOURCE SELECTION

FIELD OF THE DISCLOSURE

Aspects of the present disclosure generally relate to wireless communication and to techniques and apparatuses for sidelink resource selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first user equipment (UE) for wireless communication includes a memory and one or more processors operatively coupled to the memory, the memory and the one or more processors configured to: communicate with one or more second UEs to identify a resource overlap for a resource for relay communication; and selectively transmit using the resource with the resource overlap in accordance with a random access procedure.

In some aspects, a method of wireless communication performed by a first UE includes communicating with one or more second UEs to identify a resource overlap for a resource for relay communication; and selectively transmitting using the resource with the resource overlap in accordance with a random access procedure.

In some aspects, a non-transitory computer-readable medium storing a set of instructions for wireless communication includes one or more instructions that, when executed by one or more processors of a first UE, cause the UE to: communicate with one or more second UEs to identify a resource overlap for a resource for relay communication; and selectively transmit using the resource with the resource overlap in accordance with a random access procedure.

In some aspects, an apparatus for wireless communication includes means for communicating with one or more UEs to identify a resource overlap for a resource for relay communication; and means for selectively transmitting using the resource with the resource overlap in accordance with a random access procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a block diagram of an example apparatus for wireless communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
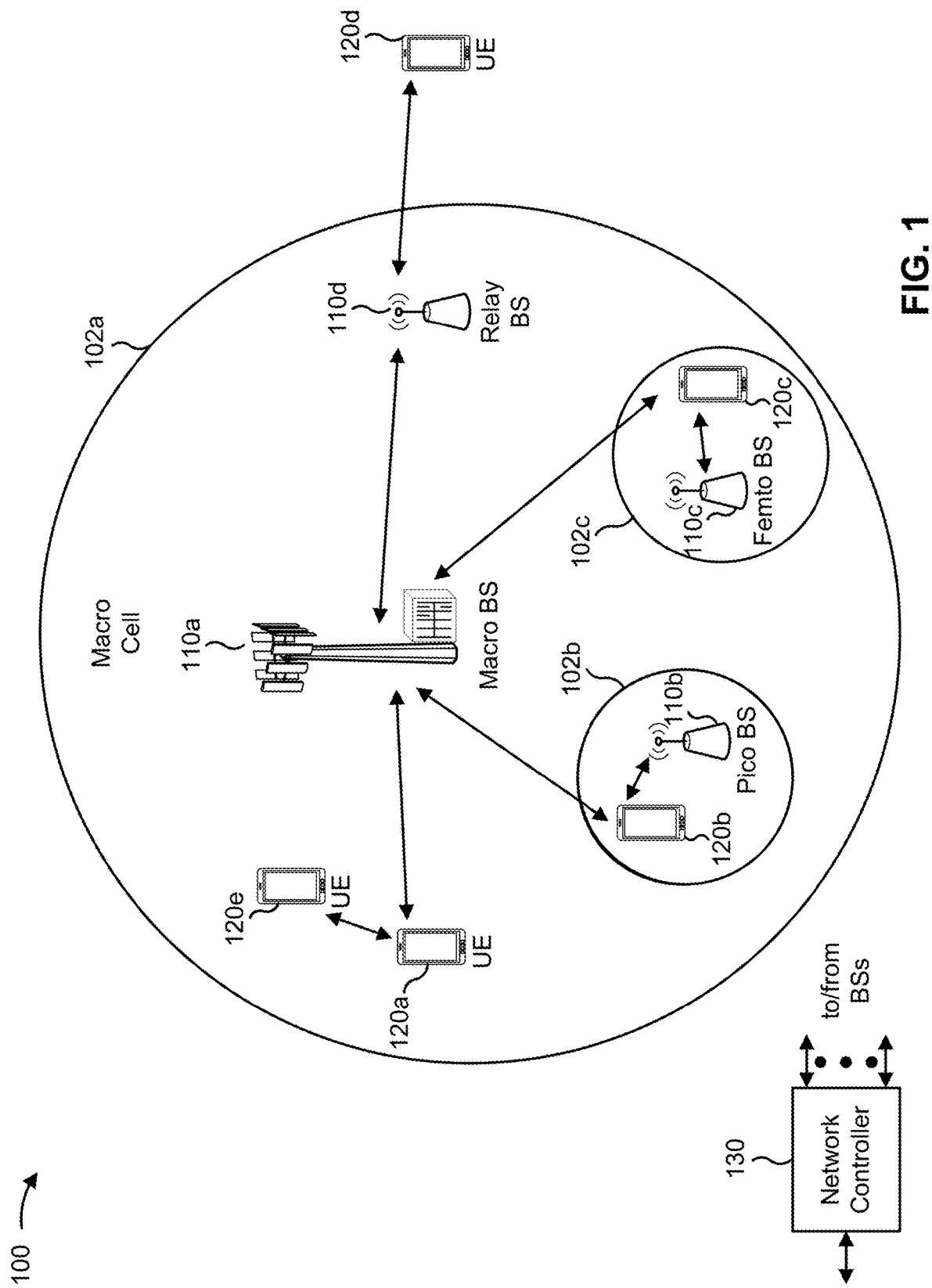
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
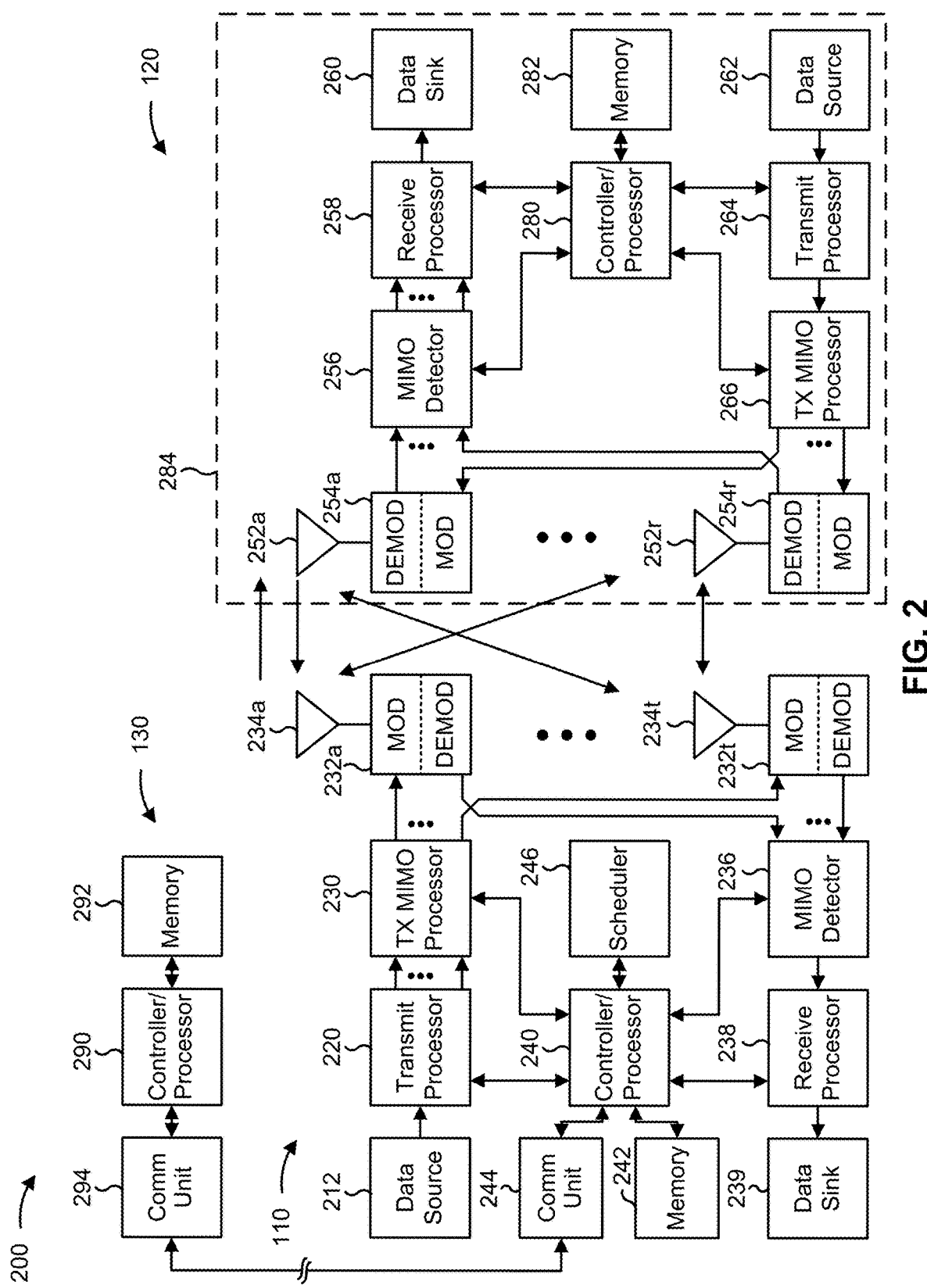
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 9-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 9-10.

Controller/processor 240 of base station 110, controller/processor 280 of UE 120, and/or any other component(s) of FIG. 2 may perform one or more techniques associated with sidelink resource selection, as described in more detail elsewhere herein. For example, controller/processor 240 of base station 110, controller/processor 280 of UE 120, and/or any other component(s) of FIG. 2 may perform or direct operations of, for example, process 1000 of FIG. 10. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10. In some aspects, executing instructions may include running the instructions, converting the instructions, compiling the instructions, and/or interpreting the instructions, among other examples.

In some aspects, a first UE includes means for communicating with one or more second UEs to identify a resource overlap for a resource for relay communication; and/or means for selectively transmitting using the resource with the resource overlap in accordance with a random access procedure. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting, to a relay UE, information on the resource based at least in part on the random access procedure.

In some aspects, the first UE includes means for refraining from transmission using the resource based at least in part on the random access procedure.

In some aspects, the first UE includes means for selectively transmitting using the resource based at least in part on a prioritization factor.

In some aspects, the first UE includes means for communicating with the one or more second UEs to indicate whether the first UE will use the resource in accordance with the random access procedure.

In some aspects, the first UE includes means for communicating with a relay UE, wherein the relay UE provides notifications regarding resource reservations by a set of source UEs.

In some aspects, the first UE includes means for selectively transmitting using the resource based at least in part on an online access pattern, wherein the online access pattern is based at least in part on a probability relating to the random access procedure.

In some aspects, the first UE includes means for selectively transmitting using the resource based at least in part on an offline access pattern, wherein the offline access pattern is based at least in part on received signaling.

In some aspects, the first UE includes means for selectively transmitting using the resource based at least in part on a probability factor associated with the random access procedure, wherein the probability factor is determined based at least in part on at least one of a stored configuration, a statically signaled configuration, or a dynamically signaled configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
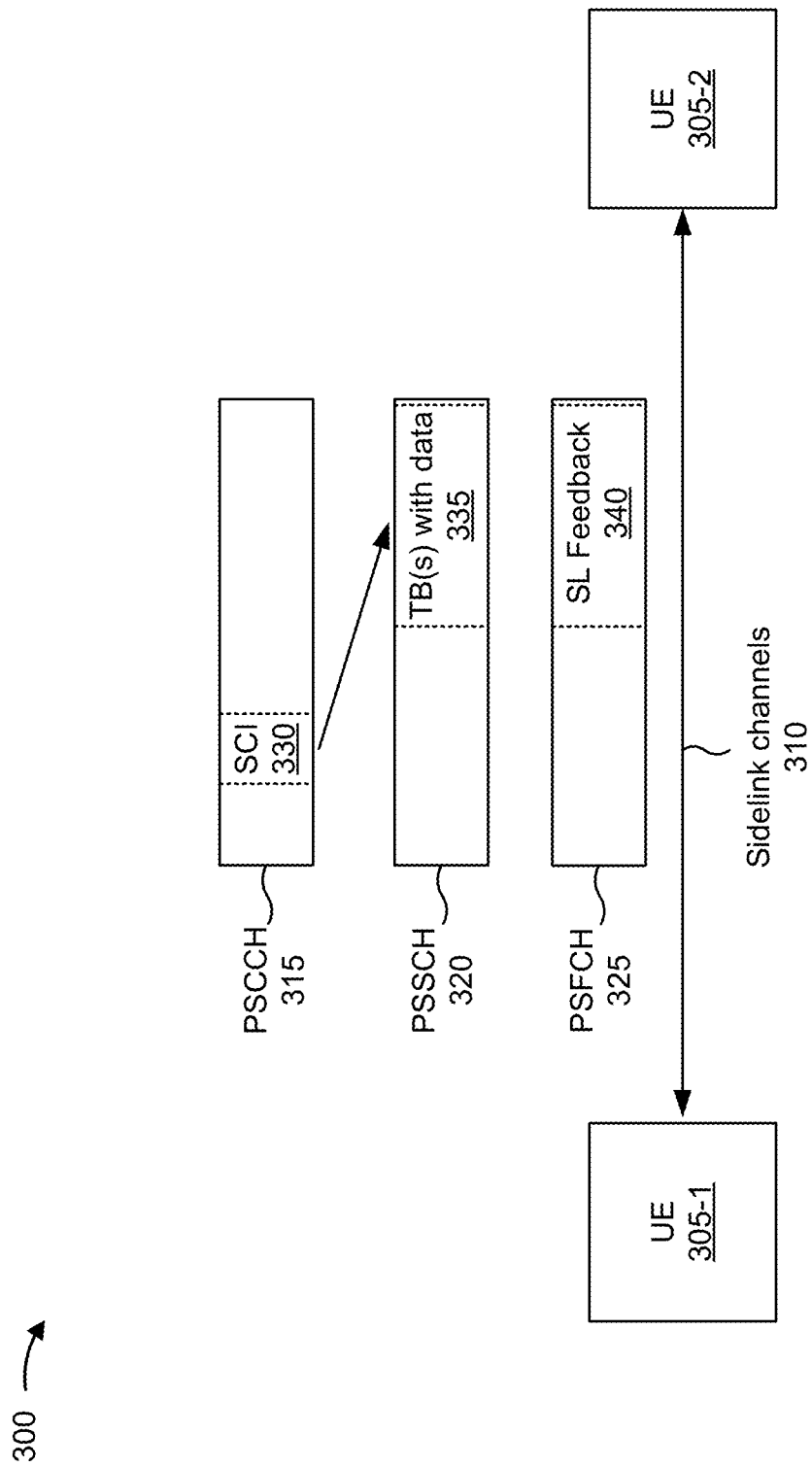
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for peer-to-peer (P2P) communications, device-to-device (D2D) communications, vehicle-to-everything (V2X) communications (e.g., which may include vehicle-to-vehicle (V2V) communications, vehicle-to-infrastructure (V2I) communications, vehicle-to-pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel.

The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320.

SCI 330 may be conveyed via two stages. For example, UEs 305 may transmit first stage control information (SCI-1) on a PSCCH to provide information identifying a resource allocation or information for use in decoding second stage control information (SCI-2). In some aspects, SCI-1 may include information identifying a priority (e.g., a quality of service (QoS) value), a PSSCH resource assignment (e.g., frequency or time resources for the PSSCH), a resource reservation, a selection of a PSSCH DMRS pattern (e.g., if more than one possible DMRS pattern is configured), a format of subsequent SCI-2 (e.g., information identifying a size of the SCI-2 corresponding to the SCI-1), a 2-bit beta offset for a resource allocation for the SCI-2, a quantity of PSSCH DMRS ports to use (e.g., 1 DMRS port or 2 DMRS ports), or a 5-bit modulation and coding scheme (MCS) parameter, among other examples.

The UEs 305 may transmit the SCI-2 on a PSSCH to convey information associated with decoding data on the PSSCH. Both SCI-1 and SCI-2 may use a PDCCH polar code. In some aspects, the SCI-2 may include information associated with determining transport block retransmission, such as a hybrid automatic repeat request (HARD) process identifier, a new data indicator, a source identifier, a destination identifier, a channel state information (CSI) report trigger parameter (e.g., for unicast communication modes), or a zone identifier or a maximum communication range (e.g., for groupcast communication modes).

Two stage control may be introduced to provide forward compatibility with future releases of UEs, which may have new features. In other words, SCI-1 may be decodable by all versions of UEs (e.g., 3GPP Release 16 (Rel. 16) UEs, Release 17 (Rel. 17) UEs, etc.) and SCI-2 may be decodable by some UEs (e.g., 3GPP Release 18 (Rel. 18) UEs) but not by other UEs. In this way, by defining two-stage SCI, new features can be introduced in future releases without resource collisions occurring between UEs of different releases.

The TB 335 may include data. The PSFCH 325 may be used to communicate sidelink feedback 340, such as HARQ feedback (e.g., acknowledgement (ACK) or negative acknowledgement (NACK) (ACK/NACK) information), transmit power control (TPC), a scheduling request (SR), and/or the like. Other possible channels may include a physical sidelink broadcast channel (PSBCH).

In some aspects, reference signals may be transmitted on the one or more sidelink channels 310 to enable configuration of transmission or reception of the one or more sidelink channels 310. For example, PSCCH 315, PSSCH 320, and PSFCH 325 may be associated with respective demodulation reference signals (DMRSs). Similarly, the UEs 305 may transmit a channel state information reference signal (CSI-RS), a sidelink primary synchronization signal (S-PSS), a sidelink secondary synchronization signal (S-SSS), or a phase tracking reference signal (PTRS) (e.g., for FR2 communication).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
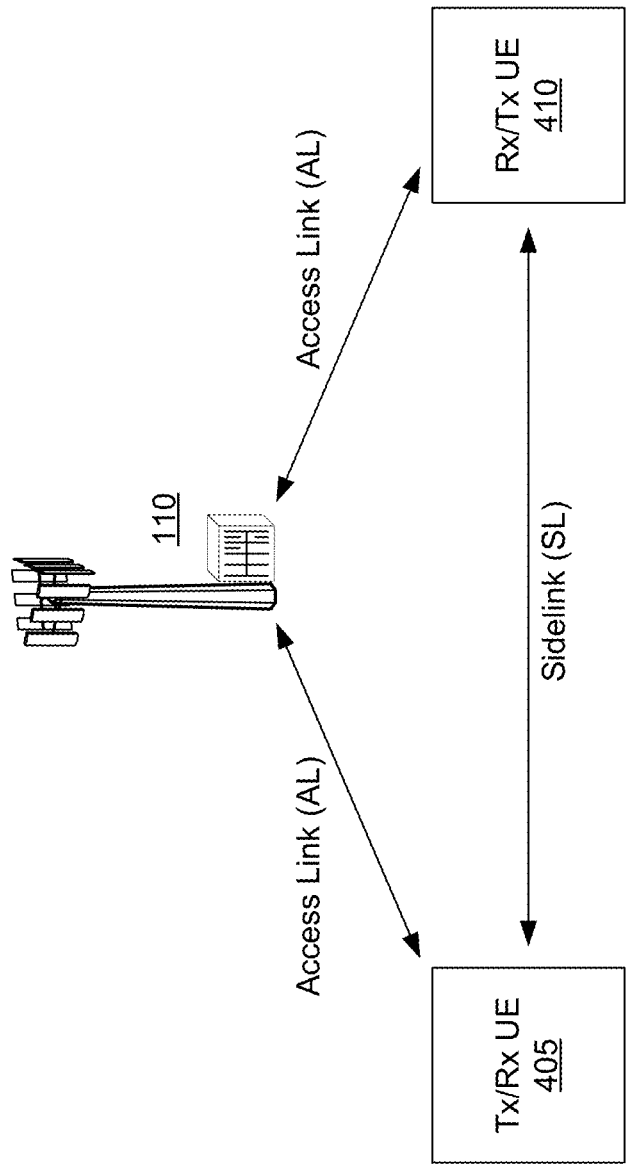
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. In some sidelink modes, base station 110 may allocate resources for sidelink communications between UEs. For example, base station 110 may transmit a resource grant to Tx/Rx UE 405 to enable Tx/Rx UE 405 to transmit to Rx/Tx UE 410. In contrast, in other sidelink modes, UEs may autonomously select sidelink resources. For example, Tx/Rx UE 405 may select sidelink resources (e.g., using contention-based access) for transmission to Rx/Tx UE 410 (without base station 110 allocating the sidelink resources).

The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, base station 110 may establish a multi-hop tunnel using a UE for relaying. For example, base station 110 may transmit a groupcast message to Tx/Rx UE 405 and Rx/Tx UE 410 to configure Rx/Tx UE 410 as a relay UE to relay communications from Tx/Rx UE 405 to base station 110. In this case, Tx/Rx UE 405 (e.g., the UE from which a communication originates) may be termed a "source UE" or a "remote UE" and Rx/Tx UE 405 (e.g., any UE that relays the communication toward another UE or toward base station 110) may be termed a "relay UE" or "receive UE." Base station 110 may establish tunnels of one or more relay UEs to relay communications between base station 110 and a source UE. A source UE may use a plurality of tunnels to communicate with base station 110. For example, a source UE may transmit a communication (e.g., using transmission repetition) using groupcast to a first relay UE and a second relay UE, and each of the first relay UE and the second UE may transmit the communication using unicast to base station 110. In some aspects, base station 110 may establish a restriction of a quantity of hops to use for relaying.

Different configurations of relay UEs may be possible, such as configurations where each relay UE has a direct link to base station 110 and may optionally have a direct link to another relay UE, configurations where some relay UEs only have direct links to other relay UEs (and other relay UEs then have direct links to base station 110), or configurations where UEs are grouped and each group has at least one direct link to another group or to base station 110, among other examples. Similarly, different coverage scenarios may occur. For example, sidelink communication may be used in in-coverage scenarios (e.g., when each UE has a direct link to base station 110), out-of-coverage scenarios (e.g., when each UE lacks a direct link to base station 110), or partial-coverage scenarios (e.g., when at least one UE has a direct link to base station 110 and at least one UE lacks a direct link to base station 110), among other examples. In the in-coverage scenarios, base station 110 may control sidelink authorization and provisioning as well as sidelink discovery and resource allocation. In the out-of-coverage scenarios, sidelink UEs may operate without authorization and provisioning, and may autonomously perform discovery and communication resource allocation. In the partial-coverage scenarios, base station 110 may control authorization and provisioning and/or sidelink UEs may autonomously perform discovery and communication resource allocation.

As indicated above, FIG. 4 is provided as an example. Other examples may differ from what is described with respect to FIG. 4.

Figure 5A:
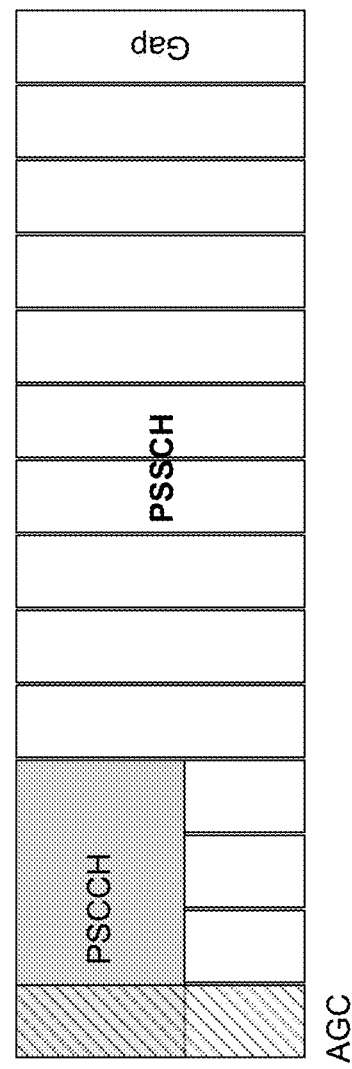
FIGS. 5A and 5B are diagrams illustrating an example of slot structures, in accordance with various aspects of the present disclosure.
Figure 5B:
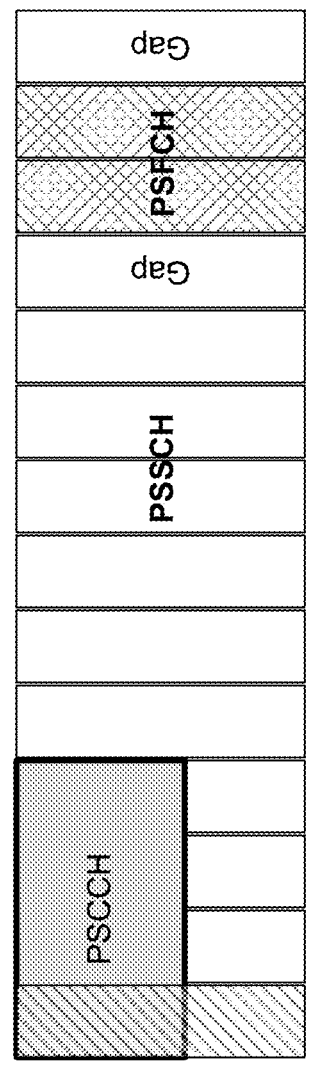

FIGS. 5A and 5B are diagrams illustrating examples 500/500' of slot structures, in accordance with various aspects of the present disclosure.

As shown in FIG. 5A, a slot includes 14 orthogonal frequency division multiplexing (OFDM) symbols without allocated feedback resources. Sidelink resources may be configured to occupy all or some of the symbols of the slot. A sequentially first symbol of a slot for sidelink communication may be repeated on a sequentially second symbol to allow for automatic gain control (AGC) settling. A first portion of a first one or more symbols may be assigned for a PSCCH and a second portion of the first one or more symbols, as well as a second one or more symbols, may be assigned for a PSSCH. For example, a first one or more sub-channels may convey the PSCCH in a first one or more symbols and a second one or more sub-channels may convey the PSSCH in the first one or more symbols. Thereafter, all of the sub-channels may convey the PSSCH. In some cases, the PSCCH and the PSSCH may always occur in the same slot. A size of each sub-channel may be a particular quantity of physical resource blocks (PRBs), such as 10, 15, 20, 25, 50, 75, or 100, among other examples of quantities of PRBs. A last symbol of the slot may be assigned as a gap symbol after a PSSCH.

As shown in FIG. 5B, another slot may include a PSFCH along with the PSCCH and the PSSCH. For example, resources for a PSFCH may be allocated in some slots, such as with a periodicity of 0, 1, 2, or 4 slots, among other examples. In other words, every slot may include resources for the PSFCH (e.g., a periodicity of 1) or every other slot may include resources for the PSFCH (e.g., a periodicity of 2), among other examples. In a slot that includes resources for the PSFCH, as shown, one or more symbols may be assigned for the PSFCH. Further, a first gap symbol may occur before the one or more symbols assigned for the PSFCH and a second gap symbol may occur after the one or more symbols assigned for the PSFCH.

As indicated above, FIGS. 5A and 5B are provided as examples. Other examples may differ from what is described with respect to FIGS. 5A and 5B.

Figure 6:
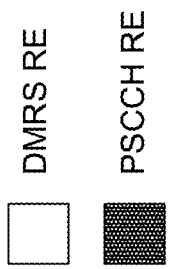
FIG. 6 is a diagram illustrating an example of a physical sidelink control channel (PSCCH), in accordance with various aspects of the present disclosure.
Figure 6:
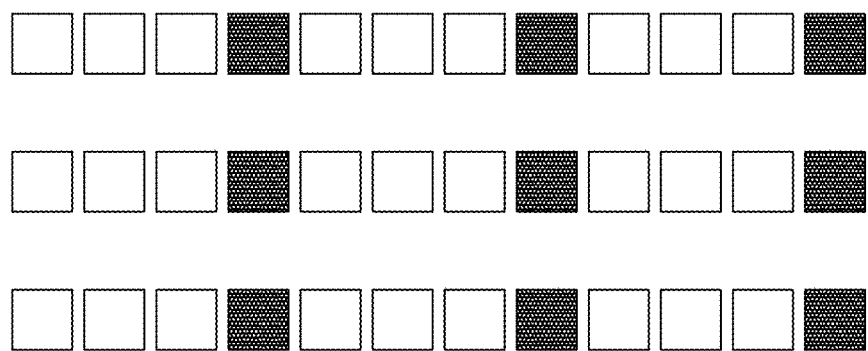

FIG. 6 is a diagram illustrating an example 600 of a physical sidelink control channel (PSCCH), in accordance with various aspects of the present disclosure.

A PSCCH may be configured to span a particular quantity of PRBs in a single sub-channel (e.g., 10, 12, 15, 20, or 25 PRBs, among other examples). A duration of the PSCCH may be a particular quantity of symbols in a slot, such as 2 symbols or 3 symbols, among other examples. As shown in FIG. 6, every fourth resource element of a PSCCH symbol may be assigned as a DMRS resource element (RE). The remaining resource elements of the PSCCH symbols are assigned as PSCCH resource elements. In this case, frequency division (FD) orthogonal cover code (OCC) (FD-OCC) is applied to the DMRS resource elements to reduce an effect of colliding PSCCH transmissions. A transmitting UE may select an FD-OCC from a set of configured FD-OCCs using a random selection procedure or a pseudo-random selection procedure, among other examples.

As indicated above, FIG. 6 is provided as an example. Other examples may differ from what is described with respect to FIG. 6.

Figure 7A:
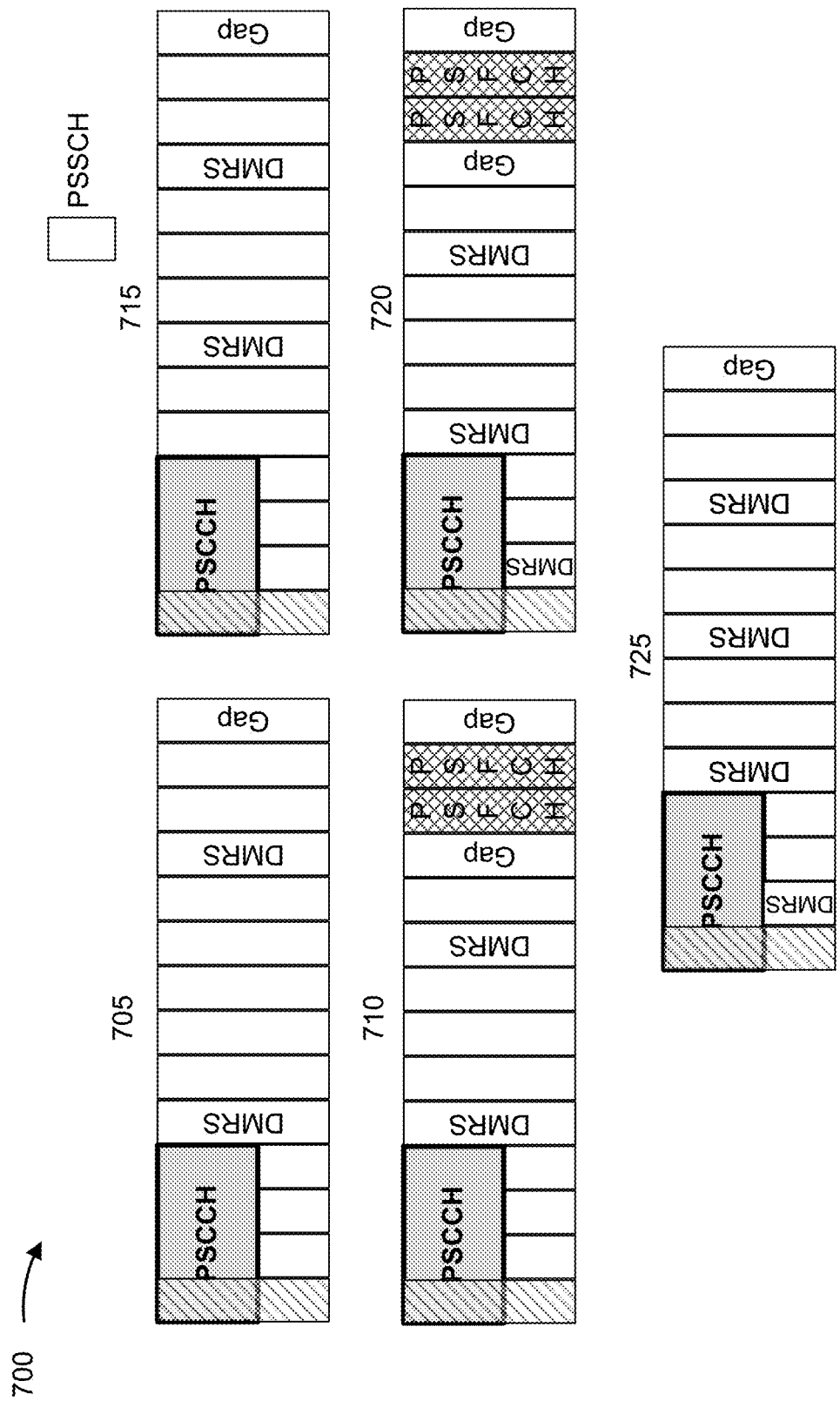
FIGS. 7A and 7B are diagrams illustrating an example of a physical sidelink shared channel (PSSCH), in accordance with various aspects of the present disclosure.
Figure 7B:
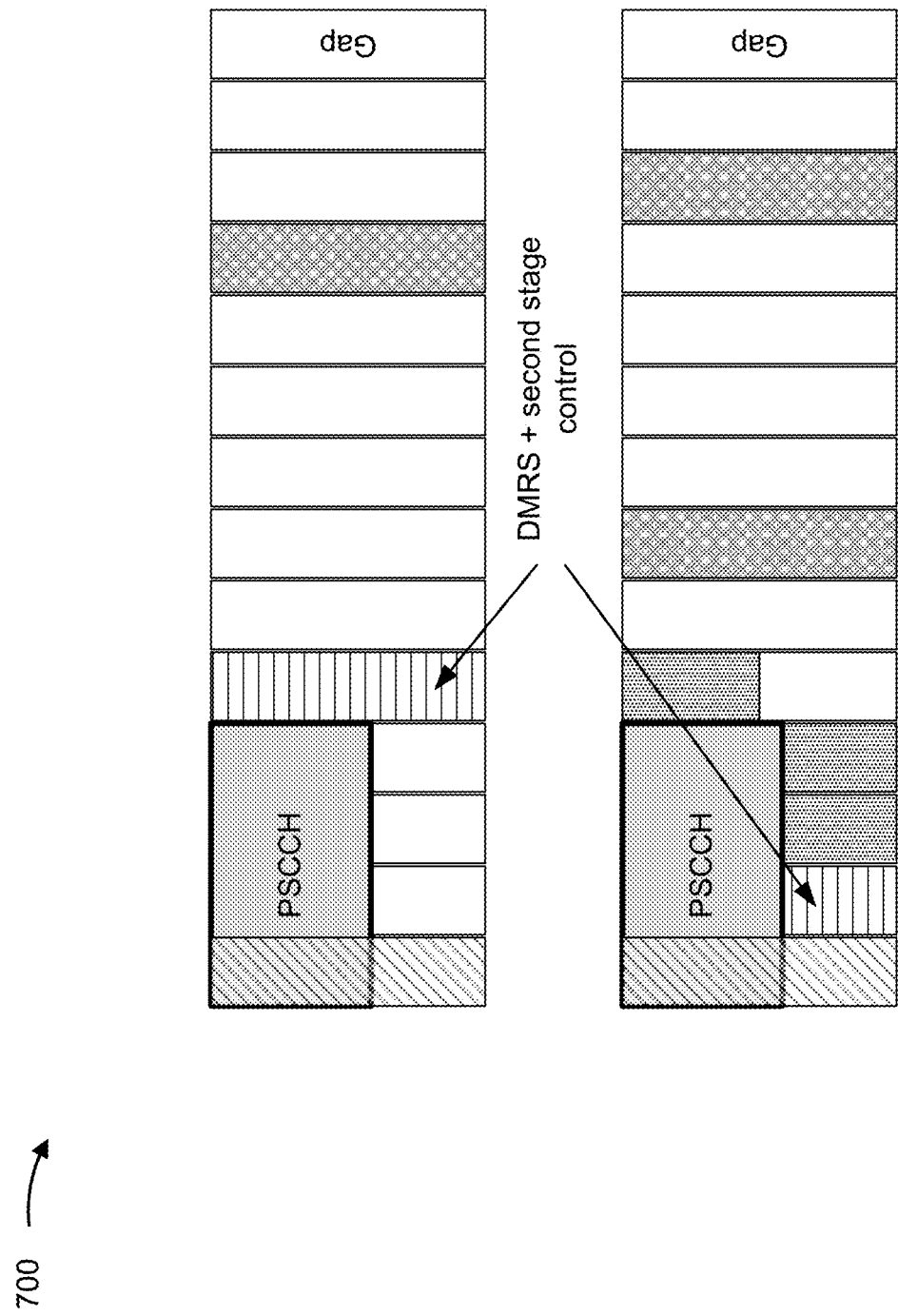

FIGS. 7A and 7B are diagrams illustrating an example 700 of a physical sidelink shared channel (PSSCH), in accordance with various aspects of the present disclosure.

As shown in FIG. 7A, a transmitter (e.g., a first UE) can configure different types of DMRS patterns. For example, the transmitter may configure a two symbol DMRS pattern without a PSFCH or with a PSFCH, as shown by reference numbers 705 and 710, respectively. Similarly, the transmitter may configure a three symbol DMRS pattern without a PSFCH or with a PSFCH, as shown by reference numbers 715 and 720, respectively. Similarly, the transmitter may configure a four symbol DMRS pattern without a PSFCH, as shown by reference number 725. In some aspects, the transmitter may configure a particular quantity of transmission layers, such as one or two transmission layers with quadrature phase shift keying (QPSK) modulation or quadrature amplitude modulation (QAM) (e.g., 16-QAM, 64-QAM, or 256-QAM), among other examples. The transmitter may select a DMRS pattern based at least in part on channel conditions or a type of modulation, among other examples, and may transmit signaling identifying the DMRS pattern (e.g., to a receiver, such as a second UE) via sidelink control information (SCI) type-1 (SCI-1) messaging. Although some aspects are described herein in terms of 14 OFDM symbol PSSCH, other DMRS patterns may be possible for a 12 OFDM symbol PSSCH or a 9 OFDM symbol PSSCH, among other examples.

As shown in FIG. 7B, resources of a slot may be assigned for second stage control information, such as an SCI-2. For example, at least a portion of an OFDM symbol may be allocated for a DMRS and the second stage control. The second stage control may map to contiguous resource blocks in a PSSCH starting from a first symbol, of the PSSCH, that includes a DMRS. For example, in a first slot, a fifth symbol is the first symbol that includes a DMRS and is assigned to include one or more resource blocks for second stage control. As another example, in a second slot, a second symbol is the first symbol that includes a DMRS and is assigned to include the second stage control (along with the DMRS in a PSSCH sub-channel of the slot, where another sub-channel of the slot is being assigned for a PSCCH, as described above).

In some aspects, the transmitter may scramble the second stage control separately from the PSSCH and may use QPSK modulation for the second stage control. In some aspects, the transmitter may indicate a format for the SCI-2 that conveys the second stage control information. For example, the transmitter may transmit an SCI-1 to identify a format of the SCI-2 and the receiver may derive a quantity of resource elements for the SCI-2 based at least in part on a content of the SCI-1. In some aspects, when the transmitter transmits using a plurality of transmission layers (e.g., 2 transmission layers), the transmitter may transmit the same SCI-2 information on each of the plurality of transmission layers.

As indicated above, FIGS. 7A and 7B are provided as example. Other examples may differ from what is described with respect to FIGS. 7A and 7B.

Figure 8:
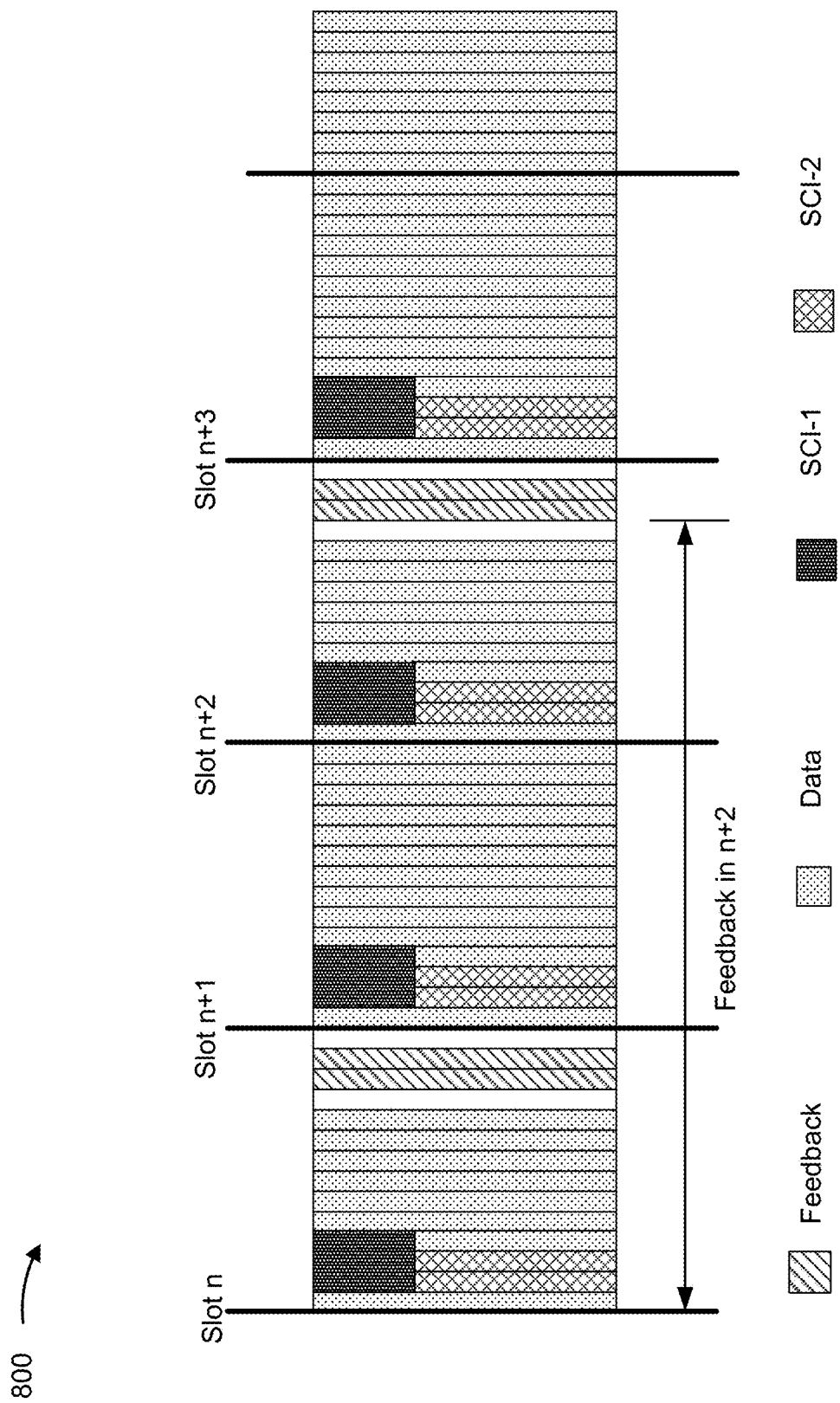
FIG. 8 is a diagram illustrating an example of a physical sidelink feedback channel (PSFCH), in accordance with various aspects of the present disclosure.

FIG. 8 is a diagram illustrating an example 800 of a physical sidelink feedback channel (PSFCH), in accordance with various aspects of the present disclosure.

As shown in FIG. 8, one or more symbols may be assigned for the PSFCH in one or more slots with a particular periodicity. For example, in this case, two symbols are assigned for the PSFCH in alternating slots (e.g., slot n, slot n+2, etc.) and a gap symbol is assigned between data transmissions (of a PSSCH) and the PSFCH. With regard to use of the PSFCH, a transmitter may transmit a PUCCH format 0 with a resource block that conveys hybrid automatic repeat request (HARQ) acknowledgement (ACK) information for a PSSCH transmission. In this case, the receiver may use the PSFCH resources for a HARQ feedback message (e.g., a HARQ ACK or a HARQ negative acknowledgement (NACK)) as a response to the PSSCH transmission. The PSFCH resources may be used for unicast communication (e.g., 1 bit for the receiver to transmit a HARQ ACK or NACK) or for groupcast communications (e.g., the receiver may transmit only a HARQ NACK in some configurations or may transmit either a HARQ ACK or a NACK in other configurations). In some aspects, a PSFCH resource may map to a corresponding PSSCH resource based at least in part on a starting sub-channel of the PSSCH, a slot that includes the PSSCH, a source identifier, or a destination identifier, among other examples. In some aspects, a quantity of available PSFCH resources may correspond to a quantity of UEs in a groupcast group when groupcast communication is enabled.

As indicated above, FIG. 8 is provided as an example. Other examples may differ from what is described with respect to FIG. 8.

As described above, in sidelink communication, a transmitting UE may select a resource for transmission. For example, a source UE may select a resource for transmission of a communication to a relay UE. Similarly, the relay UE may select a resource for relay of the communication to another relay UE or to a base station, among other examples. When a plurality of transmitting nodes, such as a plurality of source UEs, a plurality of relay UEs, or a combination of one or more source UEs and one or more relay UEs, among other examples, select the same resources, the plurality of transmitting nodes may interfere with each other. As a result, some sidelink communications may be inadvertently dropped, which may reduce communication performance. Additionally, or alternatively, some transmitting nodes may identify the interference and perform retransmissions which may result in excessive network traffic to complete communications.

Some aspects described herein enable resource selection to manage interference in sidelink communications. For example, a first source UE may identify an overlap between a first resource pool for the first source UE and a second resource pool for a second source UE and may perform a random access procedure to avoid interference with the second source UE. Additionally, or alternatively, the first source UE may determine to remain silent on the resource to enable prioritization of the second source UE, or vice versa. In this way, sidelink UEs reduce a likelihood of attempting to transmit on the same resource, thereby reducing interference, dropped communications, or network traffic, among other examples, relative to allowing a plurality of UEs to transmit on the same resource.

Figure 9:
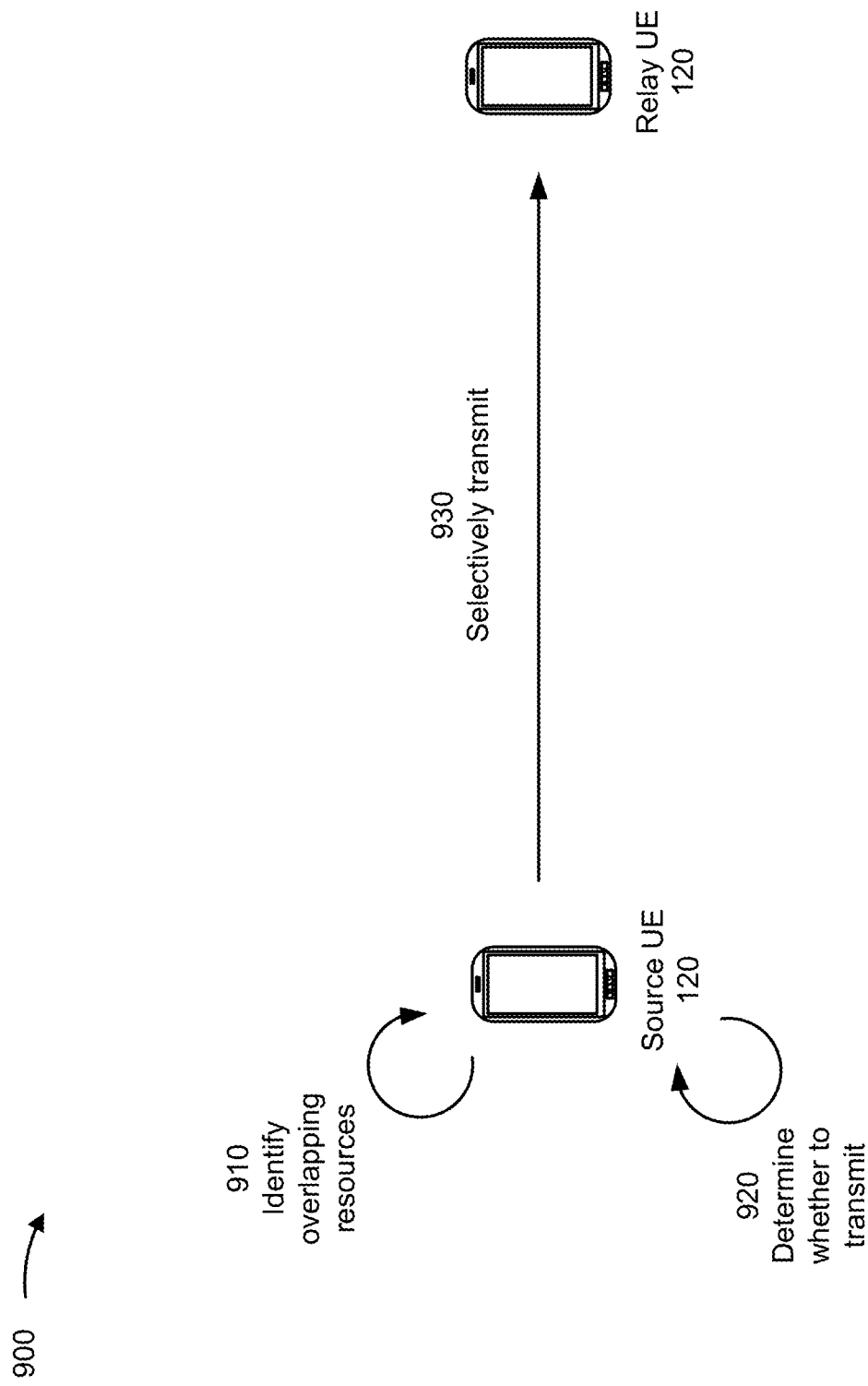
FIG. 9 is a diagram illustrating an example associated with sidelink resource selection, in accordance with various aspects of the present disclosure.

FIG. 9 is a diagram illustrating an example 900 associated with sidelink resource selection, in accordance with various aspects of the present disclosure. As shown in FIG. 9, example 900 includes communication between a source UE 120 and a relay UE 120. In some aspects, source UE 120 and relay UE 120 may be included in a wireless network, such as wireless network 100, with one or more other source UEs 120, relay UEs 120, or base stations 110, among other examples. Source UE 120 and relay UE 120 may communicate via a wireless access link, which may include an uplink and a downlink.

As further shown in FIG. 9, and by reference number 910, source UE 120 may identify overlapping resources. For example, source UE 120 may receive information identifying resources of other source UEs. In this case, each source UE in an area may transmit information, such as via one or more SCIs, to identify resource reservations or resource pools from which to reserve resources. Additionally, or alternatively, source UE 120 may receive information identifying overlapping resources from relay UE 120. For example, source UE 120 (and other source UEs) may provide information to relay UE 120 identifying resources that source UE 120 is to use (e.g., via one or more SCIs), and relay UE 120 may provide information identifying an overlap between resources of source UE 120 and resources of one or more other source UEs.

As further shown in FIG. 9, and by reference number 920, source UE 120 may determine whether to transmit. For example, source UE 120 may perform a random access procedure to determine whether to transmit. In this case, source UE 120 may determine to transmit with a probability, p, and determine not to transmit with a probability of 1−p. In some aspects, source UE 120 may determine the probability p based at least in part on stored information. Additionally, or alternatively, source UE 120 may receive signaling (e.g., radio resource control (RRC) or medium access control (MAC) control element (CE) signaling, among other examples) identifying the probability p. In some aspects, source UE 120 may determine the probability p based at least in part on a prioritization, such as based at least in part on a quality of service (QoS) value, a transport block size (TBS), a quantity of source UEs that are to transmit, or a quantity of relay UEs that are to relay communications, among other examples. In this case, based at least in part on evaluating the random access procedure using a probability, source UE 120 may use a portion of available transmission opportunities for transmission to relay UE 120, and other source UEs may use other portions of the available transmission opportunities with a reduced likelihood of interference.

In some aspects, source UE 120 may periodically alter the value for the probability p. For example, source UE 120 may update the probability p based at least in part on an average communication performance. Additionally, or alternatively, source UE 120 may use reinforcement learning or a gradient descent method, among other techniques, to periodically alter the probability p to optimize communication.

In some aspects, source UE 120 may perform the random access procedure on overlapping resources. For example, for resources that are common to source UE 120 and one or more other source UEs, source UE 120 may perform the random access procedure to determine whether to use the resources. Additionally, or alternatively, source UE 120 may perform the random access procedure on non-overlapping resources. For example, when source UE 120 identifies a resource overlap for a first resource in a transmission opportunity and no resource overlap for a second resource in the transmission opportunity, source UE 120 may perform the random access procedure to determine whether to use any resources in the transmission opportunity (e.g., whether to use the first resource or the second resource, rather than performing the random access procedure only to determine whether to use the first resource).

In some aspects, source UE 120 may determine whether to transmit based at least in part on a prioritization. For example, source UE 120 may determine a priority level or QoS of a communication relative to other communications by other source UEs and may determine whether to transmit based at least in part on respective priority levels or QoSs. In this case, source UE 120 may determine a priority level of a communication of another source UE based at least in part on, for example, information included in an SCI transmitted by the other source UE. Additionally, or alternatively, relay UE 120 may determine respective priority levels of different source UEs and provide information to source UE 120 indicating the respective priority levels (for source UE 120 to determine whether to transmit) or indicating whether source UE 120 is to transmit (based at least in part on a determination by relay UE 120).

In some aspects, source UE 120 may use a particular type of access pattern to determine whether to transmit. For example, source UE 120 (and other source UEs) may use an online access pattern. In this case, source UE 120 (and other source UEs) may determine whether to transmit based at least in part on a network condition and the probability p for the random access procedure, among other factors. Additionally, or alternatively, source UE 120 may use an offline access pattern. In this case, source UE 120 uses a preconfigured access pattern and the probability p for the random access procedure, among other factors. For example, source UE 120 may use stored information or received signaling identifying a binary stream as the preconfigured access pattern for use with the probability p, for the random access procedure. In some aspects, source UE 120 may receive, before a transmission opportunity, radio resource control (RRC) or medium access control (MAC) control element (CE) signaling conveying the binary stream for a set of subsequent communications.

As further shown in FIG. 9, and by reference number 930, source UE 120 may selectively transmit. For example, based at least in part on a result of the random access procedure, source UE 120 may transmit using a resource or forgo transmission using the resource. Additionally, or alternatively, source UE 120 may transmit based at least in part on an instruction from relay UE 120. For example, when relay UE 120 is managing communication for a set of source UEs, relay UE 120 may select source UE 120 to transmit on a resource and relay UE 120 provide an indicator of the resource, on which to transmit, to source UE 120. In some aspects, relay UE 120 may perform interference cancellation on a transmission from source UE 120. For example, relay UE 120 may use information identifying the access pattern being used by source UE 120 (and other source UEs) to determine whether a plurality of source UEs are to transmit using the same resource. In this case, relay UE 120 may use information identifying the source UEs that are to transmit to compensate for interference between transmissions of the source UEs.

As indicated above, FIG. 9 is provided as an example. Other examples may differ from what is described with respect to FIG. 9.

Figure 10:
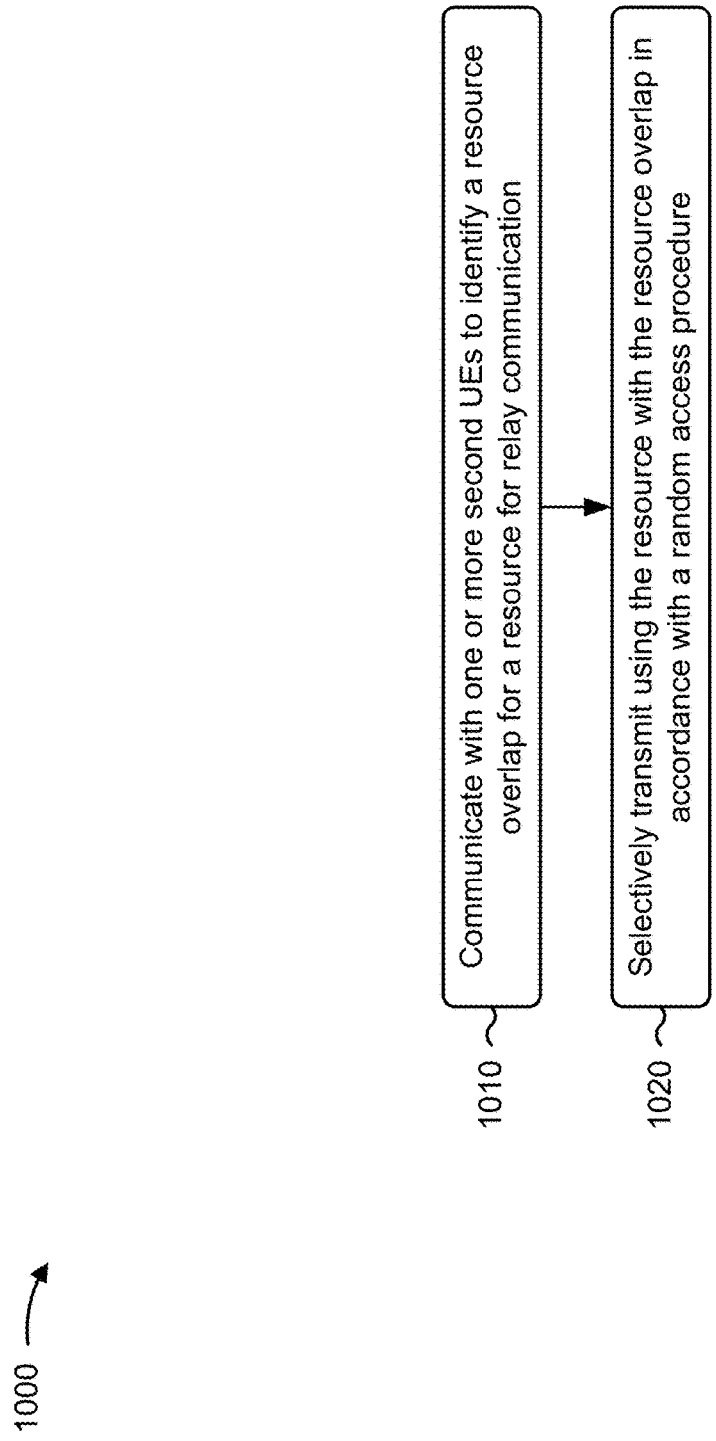
FIG. 10 is a diagram illustrating an example process associated with sidelink resource selection, in accordance with various aspects of the present disclosure.

FIG. 10 is a diagram illustrating an example process 1000 performed, for example, by a first UE, in accordance with various aspects of the present disclosure. Example process 1000 is an example where the UE (e.g., UE 120) performs operations associated with sidelink resource selection.

As shown in FIG. 10, in some aspects, process 1000 may include communicating with one or more second UEs to identify a resource overlap for a resource for relay communication (block 1010). For example, the first UE (e.g., using reception component 1102 or transmission component 1104, depicted in FIG. 11) may communicate with one or more second UEs to identify a resource overlap for a resource for relay communication, as described above.

As further shown in FIG. 10, in some aspects, process 1000 may include selectively transmitting using the resource with the resource overlap in accordance with a random access procedure (block 1020). For example, the first UE (e.g., using transmission component 1104, depicted in FIG. 11) may selectively transmit using the resource with the resource overlap in accordance with a random access procedure, as described above.

Process 1000 may include additional aspects, such as any single aspect or any combination of aspects described below and/or in connection with one or more other processes described elsewhere herein.

In a first aspect, selectively transmitting using the resource comprises transmitting, to a relay UE, information on the resource based at least in part on the random access procedure.

In a second aspect, alone or in combination with the first aspect, selectively transmitting using the resource comprises refraining from transmitting using the resource based at least in part on the random access procedure.

In a third aspect, alone or in combination with one or more of the first and second aspects, selectively transmitting using the resource comprises selectively transmitting using the resource based at least in part on a prioritization factor.

In a fourth aspect, alone or in combination with one or more of the first through third aspects, communicating with the one or more second UEs comprises communicating with the one or more second UEs to indicate whether the first UE will use the resource in accordance with the random access procedure.

In a fifth aspect, alone or in combination with one or more of the first through fourth aspects, communicating with the one or more second UEs comprises communicating with a relay UE, wherein the relay UE provides notifications regarding resource reservations by a set of source UEs.

In a sixth aspect, alone or in combination with one or more of the first through fifth aspects, selectively transmitting using the resource comprises selectively transmitting using the resource based at least in part on an online access pattern, wherein the online access pattern is based at least in part on a probability relating to the random access procedure.

In a seventh aspect, alone or in combination with one or more of the first through sixth aspects, selectively transmitting using the resource comprises selectively transmitting using the resource based at least in part on an offline access pattern, wherein the offline access pattern is based at least in part on received signaling.

In an eighth aspect, alone or in combination with one or more of the first through seventh aspects, selectively transmitting using the resource comprises selectively transmitting using the resource based at least in part on a probability factor associated with the random access procedure, wherein the probability factor is determined based at least in part on at least one of a stored configuration, a statically signaled configuration, or a dynamically signaled configuration.

In a ninth aspect, alone or in combination with one or more of the first through eighth aspects, the probability factor is based at least in part on at least one of a quality of service, a transport block size, a quantity of source UEs, or a quantity of relay UEs.

In a tenth aspect, alone or in combination with one or more of the first through ninth aspects, the probability factor is updated based at least in part on a reinforcement learning procedure.

In an eleventh aspect, alone or in combination with one or more of the first through tenth aspects, a relay UE to which a transmission using the resource is directed, is configured to perform interference cancellation to decode bits of the transmission in accordance with the random access procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a block diagram of an example apparatus 1100 for wireless communication. The apparatus 1100 may be a first UE, or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIG. 9. Additionally, or alternatively, the apparatus 1100 may be configured to perform one or more processes described herein, such as process 1000 of FIG. 10, among other examples. In some aspects, the apparatus 1100 and/or one or more components shown in FIG. 11 may include one or more components of the first UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the first UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first UE described above in connection with FIG. 2. In some aspects, the transmission component 1104 may be co-located with the reception component 1102 in a transceiver.

The reception component 1102 and/or the transmission component 1104 may communicate with one or more second UEs to identify a resource overlap for a resource for relay communication. The transmission component 1104 may selectively transmit using the resource with the resource overlap in accordance with a random access procedure. The determination component 1108 may determine a resource overlap or a result of a random access procedure, among other examples. The determination component may include a controller/processor, a memory, or a combination thereof of the first UE described in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a first user equipment (UE), comprising: communicating with one or more second UEs to identify a resource overlap for a resource for relay communication; and selectively transmitting using the resource with the resource overlap in accordance with a random access procedure.

Aspect 2: The method of aspect 1, wherein selectively transmitting using the resource comprises: transmitting, to a relay UE, information on the resource based at least in part on the random access procedure.

Aspect 3: The method of one or more of aspects 1 to 2, wherein selectively transmitting using the resource comprises: refraining from transmission using the resource based at least in part on the random access procedure.

Aspect 4: The method of one or more of aspects 1 to 3, wherein selectively transmitting using the resource comprises: selectively transmitting using the resource based at least in part on a prioritization factor.

Aspect 5: The method of one or more of aspects 1 to 4, wherein communicating with the one or more second UEs comprises: communicating with the one or more second UEs to indicate whether the first UE will use the resource in accordance with the random access procedure.

Aspect 6: The method of one or more of aspects 1 to 5, wherein communicating with the one or more second UEs comprises: communicating with a relay UE, wherein the relay UE provides notifications regarding resource reservations by a set of source UEs.

Aspect 7: The method of one or more of aspects 1 to 6, wherein selectively transmitting using the resource comprises: selectively transmitting using the resource based at least in part on an online access pattern, wherein the online access pattern is based at least in part on a probability relating to the random access procedure.

Aspect 8: The method of one or more of aspects 1 to 7, wherein selectively transmitting using the resource comprises: selectively transmitting using the resource based at least in part on an offline access pattern, wherein the offline access pattern is based at least in part on received signaling.

Aspect 9: The method of one or more of aspects 1 to 8, wherein selectively transmitting using the resource comprises: selectively transmitting using the resource based at least in part on a probability factor associated with the random access procedure, wherein the probability factor is determined based at least in part on at least one of a stored configuration, a statically signaled configuration, or a dynamically signaled configuration.

Aspect 10: The method of aspect 9, wherein the probability factor is based at least in part on at least one of: a quality of service, a transport block size, a quantity of source UEs, or a quantity of relay UEs.

Aspect 11: The method of one or more of aspects 9 to 10, wherein the probability factor is updated based at least in part on a reinforcement learning procedure.

Aspect 12: The method of one or more of aspects 1 to 11, wherein a relay UE for a transmission using the resource is configured to perform interference cancellation to decode bits of the transmission in accordance with the random access procedure.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors coupled to the memory, the one or more processors configured to:
communicate with one or more second UEs to identify a resource overlap for a resource for relay communication, the one or more second UEs including a relay UE that provides notifications regarding resource reservations by a set of source UEs; and selectively transmit using the resource with the resource overlap in accordance with a random access procedure.

2. The first UE of claim 1, wherein the one or more processors, when selectively transmitting using the resource, are configured to:
transmit, to the relay UE, information on the resource based at least in part on the random access procedure.

3. The first UE of claim 1, wherein the one or more processors, when selectively transmitting using the resource, are configured to:
refrain from transmission using the resource based at least in part on the random access procedure.

4. The first UE of claim 1, wherein the one or more processors, when selectively transmitting using the resource, are configured to:
selectively transmit using the resource based at least in part on a prioritization factor.

5. The first UE of claim 1, wherein the one or more processors, when communicating with the one or more second UEs, are configured to:
communicate with the one or more second UEs to indicate whether the first UE will use the resource in accordance with the random access procedure.

6. The first UE of claim 1, wherein the one or more processors, when selectively transmitting using the resource, are configured to:
selectively transmit using the resource based at least in part on an online access pattern, wherein the online access pattern is based at least in part on a probability relating to the random access procedure.

7. The first UE of claim 1, wherein the one or more processors, when selectively transmitting using the resource, are configured to:
selectively transmit using the resource based at least in part on an offline access pattern, wherein the offline access pattern is based at least in part on received signaling.

8. The first UE of claim 1, wherein the one or more processors, when selectively transmitting using the resource, are configured to:
selectively transmit using the resource based at least in part on a probability factor associated with the random access procedure, wherein the probability factor is determined based at least in part on at least one of a stored configuration, a statically signaled configuration, or a dynamically signaled configuration.

9. The first UE of claim 8, wherein the probability factor is based at least in part on at least one of:
a quality of service,
a transport block size,
a quantity of source UEs, or
a quantity of relay UEs.

10. The first UE of claim 8, wherein the probability factor is updated based at least in part on a reinforcement learning procedure.

11. The first UE of claim 1, wherein the relay UE for a transmission using the resource is configured to perform interference cancellation to decode bits of the transmission in accordance with the random access procedure.

12. A method of wireless communication performed by a first user equipment (UE), comprising:
communicating with one or more second UEs to identify a resource overlap for a resource for relay communication, the one or more second UEs including a relay UE that provides notifications regarding resource reservations by a set of source UEs; and
selectively transmitting using the resource with the resource overlap in accordance with a random access procedure.

13. The method of claim 12, wherein selectively transmitting using the resource comprises:
transmitting, to the relay UE, information on the resource based at least in part on the random access procedure.

14. The method of claim 12, wherein selectively transmitting using the resource comprises:
refraining from transmission using the resource based at least in part on the random access procedure.

15. The method of claim 12, wherein selectively transmitting using the resource comprises:
selectively transmitting using the resource based at least in part on a prioritization factor.

16. The method of claim 12, wherein communicating with the one or more second UEs comprises:
communicating with the one or more second UEs to indicate whether the first UE will use the resource in accordance with the random access procedure.

17. The method of claim 12, wherein selectively transmitting using the resource comprises:
selectively transmitting using the resource based at least in part on an online access pattern, wherein the online access pattern is based at least in part on a probability relating to the random access procedure.

18. The method of claim 12, wherein selectively transmitting using the resource comprises:
selectively transmitting using the resource based at least in part on an offline access pattern, wherein the offline access pattern is based at least in part on received signaling.

19. The method of claim 12, wherein selectively transmitting using the resource comprises:
selectively transmitting using the resource based at least in part on a probability factor associated with the random access procedure, wherein the probability factor is determined based at least in part on at least one of a stored configuration, a statically signaled configuration, or a dynamically signaled configuration.

20. The method of claim 19, wherein the probability factor is based at least in part on at least one of:
a quality of service,
a transport block size,
a quantity of source UEs, or
a quantity of relay UEs.

21. The method of claim 19, wherein the probability factor is updated based at least in part on a reinforcement learning procedure.

22. The method of claim 12, wherein the relay UE for a transmission using the resource is configured to perform interference cancellation to decode bits of the transmission in accordance with the random access procedure.

23. A non-transitory computer-readable medium storing a set of instructions for wireless communication, the set of instructions comprising:
one or more instructions that, when executed by one or more processors of a first user equipment (UE), cause the first UE to:
communicate with one or more second UEs to identify a resource overlap for a resource for relay communication, the one or more second UEs including a relay UE that provides notifications regarding resource reservations by a set of source UEs; and
selectively transmit using the resource with the resource overlap in accordance with a random access procedure.

24. The non-transitory computer-readable medium of claim 23, wherein the one or more instructions, that cause the first UE to selectively transmit using the resource, cause the first UE to:
  transmit, to the relay UE, information on the resource based at least in part on the random access procedure.

25. The non-transitory computer-readable medium of claim 23, wherein the one or more instructions, that cause the first UE to selectively transmit using the resource, cause the first UE to:
  refrain from transmission using the resource based at least in part on the random access procedure.

26. An apparatus for wireless communication, comprising:
  means for communicating with one or more user equipment (UEs) to identify a resource overlap for a resource for relay communication, the one or more UEs including a relay UE that provides notifications regarding resource reservations by a set of source UEs; and
  means for selectively transmitting using the resource with the resource overlap in accordance with a random access procedure.

27. The apparatus of claim 26, wherein the means for selectively transmitting using the resource comprises:
  means for transmitting, to the relay UE, information on the resource based at least in part on the random access procedure.

28. The apparatus of claim 26, wherein the means for selectively transmitting using the resource comprises:
  means for refraining from transmission using the resource based at least in part on the random access procedure.

29. The non-transitory computer-readable medium of claim 23, wherein the one or more instructions, that cause the first UE to selectively transmit using the resource, cause the first UE to:
  selectively transmit using the resource based at least in part on a prioritization factor.

30. The non-transitory computer-readable medium of claim 23, wherein the one or more instructions, that cause the first UE to communicate with the one or more second UEs, cause the first UE to:
  communicate with the one or more second UEs to indicate whether the first UE will use the resource in accordance with the random access procedure.

* * * * *